United States Patent [19]

McGinniss

[11] 4,163,810

[45] Aug. 7, 1979

[54] ULTRAVIOLET CURABLE POWDER PAINTS

[75] Inventor: Vincent D. McGinniss, Valley City, Ohio

[73] Assignee: SCM Corporation, New York, N.Y.

[21] Appl. No.: 942,762

[22] Filed: Sep. 15, 1978

Related U.S. Application Data

[62] Division of Ser. No. 739,526, Nov. 8, 1976, Pat. No. 4,129,488.

[51] Int. Cl.$^2$ .................... C08G 18/00; C08G 63/00
[52] U.S. Cl. ................................. 427/54; 96/115 R; 96/115 P; 204/159.13; 204/159.14; 204/159.18; 204/159.19; 260/40 R; 427/372 R; 427/386; 428/418; 428/461
[58] Field of Search .................... 204/159.14, 159.18, 204/159.19, 159.13; 260/835, 836, 837 R; 427/44, 54

[56] References Cited

U.S. PATENT DOCUMENTS

| | | | |
|---|---|---|---|
| 3,919,347 | 11/1975 | Katsimbas | 260/836 |
| 4,008,138 | 2/1977 | Rosen et al. | 204/159.14 |
| 4,028,204 | 6/1977 | Rosen et al. | 204/159.14 |
| 4,052,280 | 10/1977 | McGinniss | 204/159.14 |
| 4,129,488 | 12/1978 | McGinniss | 204/159.19 |

*Primary Examiner*—Richard B. Turer
*Attorney, Agent, or Firm*—Thomas M. Schmitz

[57] ABSTRACT

Powder paint coatings of this invention are particularly suitable for ultraviolet curing and comprise specific spatial arrangements of ethylenically unsaturated polymers. The polymers contain pendant double bond unsaturation in combination with an epoxy adduct spaced on the polymer chain from a polyester adduct. The powder paint is free of cold flow and can be applied electrostatically or physically to metal substrates, moderately heated to obtain desired flow out, and then cross-linked or cured by ultraviolet irradiation.

2 Claims, 2 Drawing Figures

ULTRAVIOLET CURABLE POWDER PAINTS

This is a division of application Ser. No. 739,526, filed Nov. 8, 1976 now U.S. Pat. No. 4,129,488.

BACKGROUND OF THE INVENTION

This invention relates to improved powder paints and more particularly to ultraviolet curable powder paints produced from specific spatial arrangements of epoxy-polyester polymers.

Powder paints are ordinarily manufactured from raw batch ingredients comprising resinous binders, pigmentary solids, plasticizers, and other additives to provide good film properties and adhesion to substrates. The raw batch ingredients are uniformly mixed, formed into a coherent extrudate by hot extrusion and then comminuted to form small particle powder paints which are ordinarily free flowing at normal room temperature. Powder paints ordinarily are uniform powders less than about 325 mesh and can be effectively pigmented and expediently processed without contaminating process equipment such as suggested in commonly assigned U.S. Pat. No. 3,941,315 and the disclosure thereof is incorporated herein by reference. Powder paints contain little or no fugitive solvents and must depend upon their own inherent characteristics of the powder to level, coalesce and form an attractive coherent film on the substrate. The powder, however, must not fuse in the container or be subjective to cold flow and must maintain individual powder particles prior to application.

It now has been found that ethylenically unsaturated polymers having pendant acrylic unsaturation or similar ethylenic unsaturation can be effectively cured with ultraviolet energy provided the resinous binder for powder paints has a specific spatial arrangement of an epoxy-polyester polymer. The epoxy-polyester binder is sufficiently crystalline to resist cold flow but surprisingly provides excellent flow out at melting temperatures wherein such flow out could not be obtained by either an epoxy or a polyester polymer nor a blend of epoxy and polyester polymers. The epoxy-polyester polymer of this invention softens and flows out uniformly over a narrow melt temperature whereby the polymer can be efficiently cured by ultraviolet irradiation. The ultraviolet cured and cross-linked film exhibits excellent hardness, desirable flexibility, and excellent methyl ethyl keton (MEK) resistance.

These and other advantages will become more apparent by referring to the Detailed Description of the Invention.

SUMMARY OF THE INVENTION

Briefly, powder paints are produced from ethylenically unsaturated polymers that resist cold flow in powder form but efficiently flow out upon being subjected to moderate heat and can be efficiently cured with ultraviolet energy by compounding the powder paints with a resinous binder comprising an ethylenically unsaturated, specific spatial epoxy-polyester polymer having an epoxy adduct spaced on the polymer chain from the polyester adduct whereby the polymer surprisingly provides excellent flow out properties upon being subjected to moderate heat. The epoxy adduct can be spaced in the polymer chain or attached to the polymer chain provided the epoxy adduct is spaced from the polyester adduct. The epoxy-polyester polymer further contains an ultraviolet sensitizer and can be cured with ultraviolet energy while the powder is softened and resinous fluid whereby the epoxy-polyester polymer can be efficiently cured to form a hard flexible solvent resistant film.

IN THE DRAWINGS

DETAILED DESCRIPTION OF THE INVENTION

Figure 1:
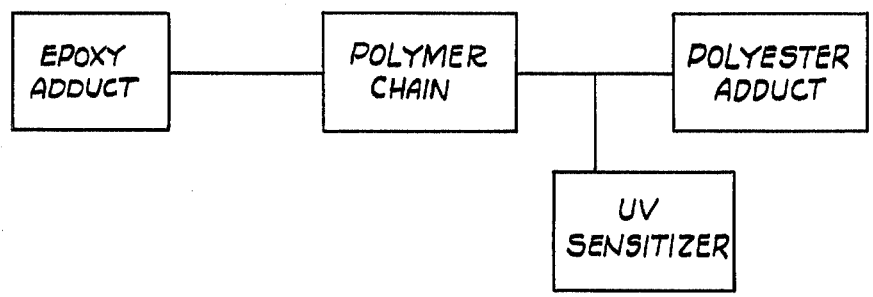
FIG. 1 is a block diagram illustrating generally the linear polymer structure of the powder paint of this invention.
Figure 2:
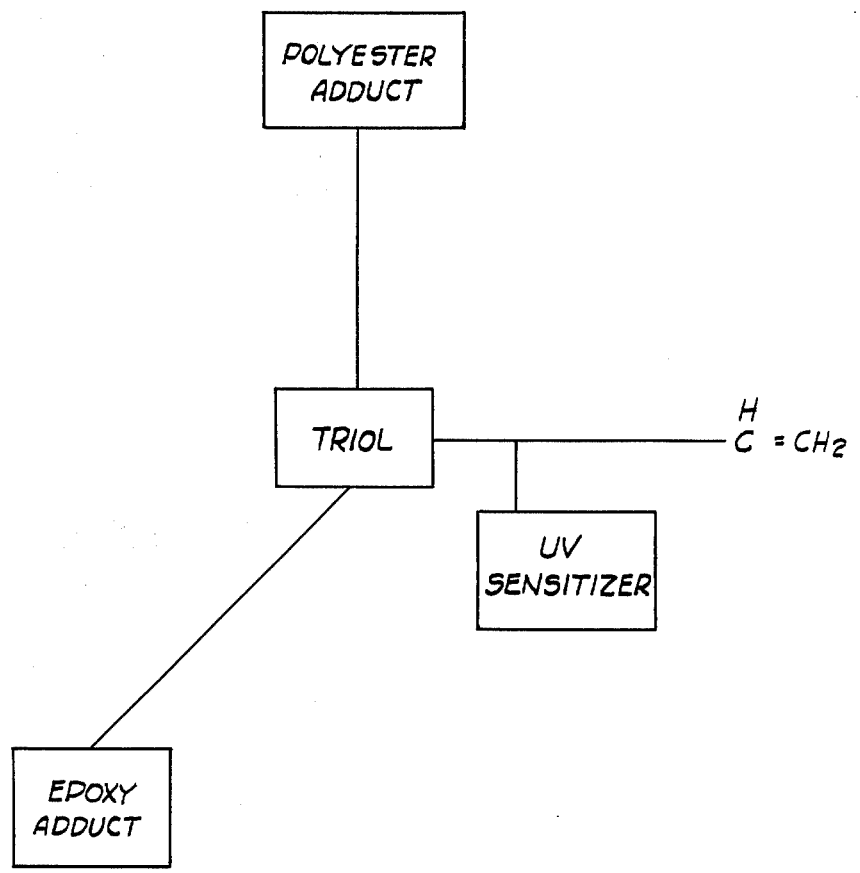
FIG. 2 is a block diagram showing more specifically a branched polymer wherein the polyester adduct is spaced in the polymer chain from the epoxy adduct, pendant acrylic unsaturation, and an ultraviolet sensitizer connected to the polymer backbone. The branching can be similarly initiated by replacing the triol with a tricarboxylic acid component.

Powder paints are made in accordance with this invention from batch ingredients primarily based on a resinous binder of an epoxy-polyester, ethylenically unsaturated polymer. FIG. 1 indicates generally a linear polymer backbone separating an epoxy adduct particularly spaced in the polymer chain from polyester adduct to provide a spatially arranged specific epoxy-polyester polymer containing ethylenic unsaturation. An ultraviolet sensitizer is shown connected to the polymer chain. FIG. 2 more specifically illustrates a branched polymer structure of this invention wherein a triol or a tricarboxylic acid effectively provides the desired polymer chain spacing of the epoxy adduct and the polyester adduct. An ultraviolet sensitizer is connected to the polymer in addition to providing a polymer chain containing pendant acrylic unsaturation for cross-linking upon exposure to ultraviolet energy.

The spatial specific epoxy-polyester polymer is produced in a step-wise process to avoid random orientation that occurs by simultaneous co-reaction of reactants and assure substantially ordered polymer design structure. The epoxy adduct and the polyester adduct can be attached or connected together by an intervening polymer chain pendant on the polymer chain and particularly spaced by a linear polymer chain intervening between the epoxy adduct and the polyester adduct. An ordered epoxy-polyester polymer is first formed by co-reacting monomer units to produce a linear polymer chain having reactive functional groups that can be further reacted with an epoxy adduct in one step and then reacted with a polyester adduct in a separate step to assure spacing of the epoxy adduct and the polyester adduct by an intervening polymer chain. The intervening polymer chain can be an alkane chain, a silicone chain, a saturated polyester chain, a polyurethane chain, or similar linear chain. The epoxy-polyester polymer has a molecular weight of at least about 1,000 and 10,000 and preferably between about 2,000 and 5,000 to provide a suitable crystallinity to the free flowing powder but advantageously exhibit a sharp melting point and excellent flow out. The specific spatial arrangement of epoxy-polyester polymer having the spaced pendant epoxy adduct and polyester adduct efficiently provides excellent flow out of the powder paint in accordance with this invention wherein the film is maintained at least tacky while efficiently curing the fluid polymer with ultraviolet energy.

An epoxy adduct can be synthesized onto the polymer of this invention by reacting a polymer chain containing a pendant epoxy group to an intervening polymer chain or connecting link shown such as illustrated in FIG. 1. The epoxy resin molecule is characterized by a reactive epoxy group having generally the structure

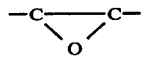

as part of the epoxy molecule in diglycidol ether of bisphenol A. The polymer chain can be increased as polymerized homologues of diglycidol ether of bisphenol A or as an epoxy molecule unit terminative nonanalogous polymer chain. Diglycidol ether of bisphenol A is produced by reacting epichlorohydrin and bisphenol A in a catalyzed condensation reaction to produce the preferred linear epoxy molecule although some epoxy adducts can be produced by reacting epichlorohydrin with other dihydric phenols or polyhydric phenols, polyalcohols, polyfunctional halohydrins, and certain polyepoxides. Epichlorohydrin and dichlorohydrin are preferred reactants with phenols to provide the pendant epoxy groups although pendant epoxy groups can be introduced into the polymer chain by reacting various glycidol ethers of glycerol. The epoxide value of the epoxy-polyester polymer of this invention is between 1 and 3.

A polyester adduct on the epoxy-polyester polymer can be produced by reacting glycols with dicarboxylic acids to form a linear polyester chain which preferably is connected to a triol as set forth in FIG. 2, or alternatively a tricarboxylic acid, to provide a polyester adduct spaced from the epoxy adduct. Suitable glycols that can be esterified with dicarboxylic acids include for example ethylene glycol, propylene glycol, diethylene glycol, dipropylene glycol, butanediol, and hexanediol as well as minor amounts of higher polymers such as pentaerythritol, triethylene glycol, trimethylol propane, glycerol or mixtures thereof. The preferred glycols are primarily higher chain length glycols having more than 4 carbon atoms such as the butanediols and hexanediols whereby preferred crystallinity is inherent in the resinous binder of the powder paints of this invention to maintain segregation of the powder particles and avoid cold flow. The dicarboxylic acids that can be esterified with the glycols are preferably saturated dicarboxylic acids such as orthophthalic anhydride or acid, terephthalic acid, isophthalic acid, adipic acid, sebacic acid, succinic acid, and similar saturated acids or anhydrides. Minor amounts of unsaturated dicarboxylic acids can be utilized to provide ethylenic unsaturation in the polymer chain, if desired, and can include for example acids or anhydrides of maleic, fumaric, mesaconic, itaconic, citraconic, or similar unsaturated dicarboxylic acids.

The epoxy-polyester polymer of this invention is an ethylenically unsaturated polymer which preferably contains pendant acrylate unsaturation and can be introduced into the polymer by reacting with the prepolymer monomeric units such as hydroxyethyl acrylate, cyclohexyl acrylate, hydroxypropyl acrylate, hydroxyethyl methacrylate, benzyl acrylate, 2-ethyl-hexyl acrylate, phenyloxyethyl acrylate, lower alkoxy ethoxy acrylate, tetrahydrofurfuryl acrylate, and n-vinyl pyrrolidone vinyl acetate. Oligomers and short chain polymers such as trimethylolpropane diacrylate and triacrylate, ethylene glycol diacrylate and dimethacrylate, 1,6-hexanediol diacrylate, pentaerythritol diacrylate, as well as acrylated polyester, acrylated urethanes, acrylated polyamides, acrylated soybean oil, and acrylated acrylic polymers can be utilized to introduce unsaturation into the polymer. The pendant acrylate chain can be connected to the epoxy polymer chain by esterification through a vinyl acid.

In accordance with a preferred aspect of this invention, ultraviolet sensitizers can be incorporated into the ethylenically unsaturated, epoxy-polyester polymer structure by reacting the ultraviolet sensitizer with a reactive group on the polymer chain to produce an ultraviolet curable polymer containing at least about 2% by weight and preferably between about 3% to 20% by weight photosensitizer. Preferred photosensitizers found useful for incorporating into the polymer structure in accordance with the preferred aspect of this invention are carboxylated phenyl nuclear ketones which generally can be selected from benzaldehydes, acetophenones, and benzophenones. Particularly useful carboxylated phenyl nuclear ketone sensitizers include, for example, ortho-, meta-, and para-hydroxy-acetophenone; 3-hydroxy-para-aminobenzaldehyde; 2-hydroxy-5-methoxybenzaldehyde; 2-(para-hydroxybenzoyl)-benzoic acid; ortho-and para-hydroxy-benzophenone; 2-hydroxy-4-methoxybenzophenone; and 3,3',4,4'-benzophenone tetracarboxylic-dianhydride. Other suitable photosensitizers include: benzoin; 2-benzoylbenzoic acid; 4'methylbenzophenone 2-carboxylic acid; 4-ethyl-benzophenone 2-carboxylic acid; 4'-chlorobenzophenone 2-carboxylic acid; 3'-chloro-4'-methyl-benzophenone-2-carboxylic acid; 3'-nitro-4'-chloro-benzophenone-2-carboxylic acid; 2,3, and 4-hydroxy acetophenone; 5-chloro-2-hydroxy benzophenone; 2-(4-hydroxy-benzoyl)-benzoic acid; 2 and 4-hydroxy-benzophenone; 2-hydroxy-4-methoxy-benzophenone; 3-hydroxy-para-anisaldehyde; 2-hydroxy-5-methoxy-benzaldehyde; 3-chloro-4-hydroxy-5-methoxy-benzaldehyde; 4'-chloro-2-hydroxy-4-methoxy-benzophenone; 5-chloro-2-hydroxy-4-methyl-benzophenone; 2-N-methylamino-benzophenone; 4-N-methylamino-benzophenone; 2-N-methylamino-acetophenone; 3-N-methylamino-acetophenone; 4-N-methylamino-acetophenone; and 2-mercapto-benzophenone, and others as identified in the examples.

Aromatic amino carbonyl photosensitizers can be similarly incorporated into the polymer backbone by including about 5% by weight aromatic amino carbonyl group in the polymer. In synthesizing an aromatic amino carbonyl group into a polyester resin, for example, a diol of paramino benzophenone is esterified together with standard glycols and diacids. Similarly, an isocyanate reacted with diol paramino benzaldehyde or paramino benzophenone or the like may be incorporated into the urethane polymer backbone. Useful synergist-producing diols may be produced, for example, by reacting active hydrogens on the amine of the amino carbonyl compounds with excess ethylene or propylene oxide to N-substituted diethanol or dipropanol compounds. Other polymers such as acrylics, epoxies, and silicones can be similarly synthesized. The aromatic or aldehyde sensitizers can be similarly incorporated into the polymer backbone. The sensitizer, for example, should contain a hydroxy or carboxy functional group for reacting with conventional reactants to produce polymers containing aromatic ketone or aldehyde sensitizer group in the polymer backbone. At least about 2% of the polymer weight is ultraviolet sensitizer and preferably between about 3% to 20% of the polymer is sensitizer.

Useful ultraviolet photosensitizers that can be incorporated into the polymer backbone further include halogenated polynuclear ketones selected from chlorosulfonated benzanthones, chlorosulfonated fluorenone, alpha-haloalkylated benzanthrones, and alpha-haloalkylated fluorenone, as disclosed in U.S. Pat. No. 3,827,957 and incorporated herein by reference. The benzanthrones can be selected from chloromethyl benzanthrone; sulfonyl chloride benzanthrone; 1,6-dichlorosulfonyl benzanthrone; isodibenzanthrone sulfonyl chloride; and dichlorosulfonyl-16,17-dibenzanthrone. The fluorenones can be selected from 2-bromomethyl-9-fluorenone sulfonyl chloride; chloromethyl-9-fluorenone-6,7 dichloro-alpha-bromofluorenone sulfonyl chloride; and 1-chloro-2-ethyl-9-fluorenone sulfonyl chloride.

Other suitable ultraviolet sensitizers that can be attached to the polymer chain further include organic carbonyl compounds selected from alkylphenones, benzophenones, and tricyclic fused ring compounds, as disclosed in U.S. Pat. No. 3,759,807 and incorporated herein by reference. Particularly desirable organic carbonyl photosensitizers can be selected from diethoxyacetophenone, benzoin, xanthone, thio-xanthone, anthraquinone, and acetonaphthone. Other suitable ultraviolet sensitizers include carbonylated phenyl nuclear sulfonyl chlorides such as meta-benzophenone monosulfonyl chloride, meta-acetophenone monosulfonyl chloride, and meta-benzaldehyde monosulfonyl chloride are particularly suitable for pigmented coatings as more particularly set forth in U.S. Pat. No. 3,827,959 and incorporated herein by reference. Other suitable photosensitizer combinations particularly suitable for pigmented coatings are a combination of sensitizers comprising aromatic carbonyl compounds, aromatic aldehydes or aromatic ketones, incorporated into the polymer backbone and used in combination with a synergistic sensitizer of about 0.05% to 3% 2,2'-dithiobis-(benzothiazole) as more particularly set forth in U.S. Pat. No. 3,847,771.

Although the ultraviolet sensitizer is preferably connected to the polymer backbone, conventional ultraviolet sensitizers can be physically added to the polymer prior to compounding the polymer with other ingredients to produce powder paint. The ultraviolet sensitizers should not volatilize at the temperatures below the melt temperature of the powder and can include for example: benzoin, benzophenone, Michler's ketone, chlorobenzophenone, benzophenone tetracarboxylic dianhydride.

The epoxy-polyester polymers have a molecular weight of between about 1,000 and 10,000 and are primarily crystalline polymers so as to avoid amorphous flow or cold flow prior to application. The polmers have a melt temperature or Tg of between about 80° C. and 200° C. and preferably between 100° C. and 140° C.

In accordance with the invention, the epoxy-polyester, ethylenically unsaturated polymers are produced in a step-wise process to avoid random orientation and assure substantially ordered polymer design structure wherein both the epoxy adduct and polyester adduct are connected in the polymer chain in a specific spatial polymer arrangement and preferably providing ethylenic unsaturation pendant on the polymer. A linear polymer chain can intervene between the epoxy adduct and the polyester adduct. An epoxy prepolymer is first formed by co-reacting epoxy units to produce a linear polymer chain having pendant epoxy groups that can be further reacted with a polyester chain in a step-wise process to assure spacing of the epoxy adduct and the polyester adduct in the polymer. The epoxy prepolymer has molecular weight of at least about 100 and preferably between 300 to 3,000. A suitable linear polymer chain can be repeating units $(X)_n$ wherein n is greater than 1 and preferably between about 2 to 50 repeating units. The epoxy prepolymer is then reacted with a polyester prepolymer wherein the polyester prepolymer chain can have a molecular weight of at least about 100 and preferably between about 1,000 and 9,000. The epoxy prepolymer and polyester prepolymer can be preformed and subsequently co-reacted. The step-wise processing is particularly preferred to avoid random polymer design which can result when the monomer components of both the epoxy and polyester polymers and the ethylenic monomer are co-reacted simultaneously. The sensitized ethylenic polymer can be a star-polymer containing two or more polymer chains having ethylenic unsaturation in one linear chain length, the epoxy adduct in the other polymer chain and the polyester adduct in another linear polymer chain whereby a polymer chain is interposed between the pendant epoxy adduct and the polyester adduct and appears to effectively provide substrate surface activity and flow out prior to ultraviolet irradiation and crosslinking of the polymer chains.

The epoxy-polyester resinous binder can be thoroughly and uniformly mixed with raw batch ingredients by homogenizing the epoxy-polyester binders, pigmentary solids, plasticizers and other components to uniformly blend the resinous binder with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder wherein the extruder is internally heated by an indirect heating fluid such as steam, hot water, or synthetic oil whereupon the exit extruder temperature is regulated according to the type of powder paint being produced but generally is between about 90° C. and 150° C. at the heated exit die of the screw fed extruder. The extrudate emerges from the extruder as a ribbon of less than about 1/16" thickness which passes onto a water cooled stainless steel conveyor belt whereby the plastic ribbon extrudate fully hardens. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrate and moderately heated between temperatures of about 80° C. and 100° C. to obtain desirable flow out. The films are concurrently irradiated with ultraviolet energy while the heated films remained at least slightly tacky and preferably fluid to produce fully cured and excellent MEK resistant paint films. The advantages of this invention will be further illustrated by referring to the following examples.

Examples 1-4 inclusive illustrate the ineffectiveness of similar polymers and are contrasted with Examples 5 and 6 illustrating the specific spatial polymer of this invention.

EXAMPLE 1

Epoxy Resin

Dow Epoxy resin DER 664 having an epoxide equivalent weight 900 and containing 2 epoxide units per 1800 molecular weight was reacted with 2 moles of acrylic acid to form the solid diacrylate adduct of the epoxy resin. This adduct was made in solution and precipitated out (alternatively can be made in excess acrylic acid followed by water washing or vacuum strip of unreacted acrylic acid).

This unsaturated solid epoxy resin was dry blended with a photoinitiator mixture of 1 part 2,2′dithiobisbenzothiazole, 3 parts benzophenone and 0.8 parts Michler's ketone. This photosensitized mixture was extruded or melted into a uniform solution between 50° C. and 150° C., cooled to room temperature, and then ground into a fine powder. The powder was sieved through 140 mesh screen to provide 100 micron particles. This photosensitized powder was electrostatically sprayed onto a steel panel, heated in an oven or under an infrared heat source to induce melting or flow-out (180° F. 1 to 20 minutes), and then was placed under an ultraviolet curing unit (2 bulb 8,000 watt Ashdee ultraviolet curing unit) for 8 seconds exposure time. The results of physical testing of the cured film are as follows: The film had good MEK resistance (over 50 rubs), and good adhesion at 0.5-0.6 mil with 90%×batch but had poor adhesion at 1.5-3 mil. Direct impact has film weights 0.5 mil 160 inch/lb.+to 100 inch/lb. at 1 mil and 50 inch/lb. at 2 mils. This coating had very poor surface characteristics (poor flow out) orange peel and only fair adhesion to the substrate but had good solvent resistance. Heat alone has no effect on the cure reaction.

EXAMPLE 2

The epoxy resin in Example 1 was modified with 19 parts rutile TiO$_2$ and 1 part carbon black dispersed into the hot clear photosensitized coating. The mixture was processed, applied and cured under the same conditions of Example 1. Results: Film thickness was 0.6 to 2 mils having good MEK resistance (over 50 rubs). Adhesion was lower for pigmented systems and impact was less (20 inch/lb. at 0.6 mil). The film had very poor surface characteristics exhibiting orange peel and wrinkles.

EXAMPLE 3

Polyester Resin

A conventional polyester resin was made from 1 mole of neopentyl glycol (104 gms), 1 mole of hydrogenated bisphenol A (240 gms), and 3 moles of isophthalic acid (498 gms), followed by termination with 2 moles of glycidyl acrylate (256 gms) to produce a solid acrylate unsaturated terminated polyester resin. The Acid No. was 3, the melt point was 120° C., and the molecular weight was 1100.

This polyester resin was photosensitized and cured under the same conditions as Examples 1 and 2 with the following physical results on the cured film.

| Results | Clear | Pigmented |
|---|---|---|
| Film thickness | 0.5 to 2 mil | 0.6–1.5 mil |
| MEK resistance | 20+ | 20+ |
| Adhesion | 50 to 80% | 20% |
| Impact | 50 in./lb. | 10 in./lb. |
|  | 1 mil | 0.6 mil |

This polyester system had poor solvent, adhesion and impact resistance in comparison to the epoxy system of Examples 1 and 2. However, the flow out and surface finish was considerably better (less orange peel).

EXAMPLE 4

Epoxy-Polyester Blend

Blends of the epoxy and polyester systems at the ratios of 25 epoxy/75 polyester; 50 epoxy/50 polyester; and 80 epoxy/20 polyester gave no overall improvement in all properties and especially exhibited poor surface film effect which had poor flow out and orange peel. The results are as follows:

|  | Solvent Resistance | Adhesion | Impact | Surface |
|---|---|---|---|---|
| 25 epoxy | 20+ | 60% | 50 in/lb | fair |
| 75 polyester | poor | poor | fair |  |
| 50 epoxy | 35+ | 80% | 75 in/lb | poor |
| 50 polyester | fair | good |  |  |
| 80 epoxy | 50+ | 80% | 100 in/lb | very |
| 20 polyester | good |  |  | poor |

Blending only gave expected results of the better epoxy system with higher concentration.

EXAMPLE 5

Polymer of this Invention

A block copolymer of epoxy-polyester was made by the reaction of one mole of acrylic acid with one mole of Dow epoxy resin DER 664 followed by further reaction with the mono acrylic unsaturated polyester resin of Example 3. One mole of glycidyl acrylate reacted onto the acid terminated polyester resin of Example 3 until an Acid No. of zero was obtained. This polymer can be made in solution or melt. This linear spatial block copolymer was as follows.

[acrylic unsaturation]—[epoxy]—[polyester]—[acrylic unsaturation]

the polymer was processed, sensitized, and cured in a similar manner as previous examples with the following results on the cured film.

| Results |  |
|---|---|
| Solvent resistance | 50 + rubs of MEK |
| Adhesion | 80%–90% |
| Impact | 100–120 in/lb |

Surface was excellent with good flow-out and no orange peel.

EXAMPLE 6

Polymer of this Invention

The polyester resin of Example 3 was made in a similar manner as the previously described but this time 1.5 moles of isophthalic acid and 1.5 moles of 4,4'-dicarboxybenzophenone were added to the reaction. This photosensitizer containing polyester was made into the epoxy-polyester spatial polymer of this invention similar to the unsaturated block copolymer of Example 5 by the process and same conditions of Example 5. The polymer contained 3% mixture, 1 part 2,2'-dithiobisbenzothiazole, 0.8 parts Michler's ketone, and the film was cured in 4 seconds. The film had improved MEK 100+ rubs, better cure with 100% adhesion, and no signs of solid particles (bloom) on the surface after 24 hours.

The polymer of Example 6 has the following polymer structure:

[acrylic unsaturation]—[epoxy]—[photosensitizer]—[polyester]—[acrylic unsaturation]

The foregoing examples are illustrative only and not intended to be limiting except by the appended claims.

I claim:

1. In a process for producing dry powder paint composition having an average particle size of less than about 325 mesh and a melting point of at least about 80° C., the powder paint composition containing a film-forming binder, the improvement comprising:

providing a spatial epoxy polyester polymer by co-reacting a preformed epoxy adduct having a molecular weight of at least about 100 and a preformed polyester adduct having a molecular weight of at least about 100 with an intervening linear polymer chain to produce a spatially arranged epoxy-polyester polymer having a molecular weight of between about 1,000 and 10,000, said epoxy polyester spatial polymer having an ultraviolet sensitizer connected to said polymer, and said polymer being an ethylenically unsaturated polymer and reactive to ultraviolet energy to cross-link the ethylenic unsaturation;

applying the powder paint composition to substrate;

heating to cause flow out of the powder paint onto the substrate to form a continuous film;

exposing the film to ultraviolet energy to cross-link and cure the film.

2. The process of claim 1 wherein a tri-reactive triol or tricarboxylic acid is reacted with said preformed epoxy adduct and said preformed polyester adduct to avoid random orientation and further reacted with an acrylic preformer to provide pendant ethylenic unsaturation whereby the star polymer contains three polymer chains, the first polymer chain being an epoxy adduct, the second polymer chain being a polyester adduct, and the third polymer chain containing pendant acrylic unsaturation.

* * * * *